United States Patent
Elman et al.

(10) Patent No.: US 6,995,395 B2
(45) Date of Patent: Feb. 7, 2006

(54) MULTILAYER OPTICAL COMPENSATOR, LIQUID CRYSTAL DISPLAY, AND PROCESS

(75) Inventors: James F. Elman, Fairport, NY (US); Charles C. Anderson, Penfield, NY (US); Debasis Majumdar, Rochester, NY (US); Mridula Nair, Penfield, NY (US); Roger Yonkoski, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 146 days.

(21) Appl. No.: 10/745,109

(22) Filed: Dec. 23, 2003

(65) Prior Publication Data

US 2005/0134772 A1 Jun. 23, 2005

(51) Int. Cl.
*H01L 31/20* (2006.01)
*H01L 21/00* (2006.01)
*G02F 1/13* (2006.01)

(52) U.S. Cl. .......................... 257/59; 438/30; 549/117
(58) Field of Classification Search ................. 257/59; 438/30; 428/1.1, 1.25, 412; 349/117, 95, 349/96, 98, 124
See application file for complete search history.

(56) References Cited

U.S. PATENT DOCUMENTS

| 5,344,916 | A | 9/1994 | Harris et al. |
| 5,480,964 | A | 1/1996 | Harris et al. |
| 5,580,950 | A | 12/1996 | Harris et al. |
| 6,582,775 | B1 | 6/2003 | Payne et al. |
| 6,822,713 | B1 * | 11/2004 | Yaroshchuk et al. ........ 349/117 |
| 2003/0219549 | A1 | 11/2003 | Shimizu |
| 2005/0024561 | A1 | 2/2005 | Elman et al. |

FOREIGN PATENT DOCUMENTS

| EP | 0 544 008 | 6/1992 |
| EP | 1 387 210 | 2/2004 |
| JP | 04 256922 | 9/1992 |

OTHER PUBLICATIONS

U.S. Appl. No. 10/431,742; filed May 8, 2003; titled "Multilayer Optical Compensator, Liquid Crystal Display, And Process"; of James F. Elman et al.
U.S. Appl. No. 10/194,162; filed Jul. 12, 2002; titled "Compensator With Crosslinked Barrier Layer And Process"; of Mridula Nair et al.

* cited by examiner

*Primary Examiner*—David Nelms
*Assistant Examiner*—Long Tran
(74) *Attorney, Agent, or Firm*—Arthur E. Kluegel

(57) ABSTRACT

Disclosed is a multilayer compensator polymeric film for a LC cell including two or more first type layers having an out-of-plane birefringence not more negative than –0.005 and one or more second type layers having an out-of-plane birefringence more negative than –0.005, wherein the second type layers are amorphous and including selected polymeric materials having sufficient thickness so that the overall in-plane retardation (Re) of the compensator is from 0 to 300 nm and the out-of-plane retardation (Rth) of at least one of the one or more second type layers is more negative than –20 nm wherein: (a) a first type layer is present that is contiguous to a second layer and is between all of the second type layers and all of the other first type layers; (b) at least one of the second type layers or one of the other first type layers is a layer coated from an organic solvent; and (c) the contiguous first type layer contains a polymer that is water soluble or water dispersible in an amount sufficient to impede the diffusion of the organic solvent between the other first type layers and the second type layers.

39 Claims, 2 Drawing Sheets

MULTILAYER OPTICAL COMPENSATOR, LIQUID CRYSTAL DISPLAY, AND PROCESS

FIELD OF THE INVENTION

The present invention relates to a multilayer optical compensator for liquid crystal displays comprising first and second layers exhibiting particular birefringent properties and wherein a first layer that is between all second layers and all of the other first layers, is a barrier layer that impedes the diffusion of organic solvents between the other first layers and the second layers. The invention also provides a LC display and a process for making such a compensator.

BACKGROUND OF THE INVENTION

Triacetylcellulose (TAC, also called cellulose triacetate) film has traditionally been used by the photographic industry due to its unique physical properties and flame retardance. TAC film is also the preferred polymer film for use as a cover sheet for the polarizers used in liquid crystal displays. It is the preferred material for this use because of its extremely low in-plane birefringence. Its out of plane birefringence is also small (but not zero), and is useful in providing some optical compensation to the LCD.

Intrinsic birefringence describes the fundamental orientation of a material at a molecular level. It is directly related to the molecular structure (bond angles, rotational freedom, presence of aromatic groups, etc.) of the material. The intrinsic birefringence is not affected by process conditions (temperature, stresses, pressures) used to make a macroscopic object.

Crystalline and liquid crystalline materials have the convenient property that their intrinsic birefringence manifests itself almost perfectly when they are assembled into a macroscopic article. Layers of crystalline and liquid crystalline molecules often can be manufactured such that all the molecules in the article are in registry with each other and thus preserve their fundamental orientation. The same is not true when making layers of an amorphous polymeric material. Their intrinsic birefringence can be highly modified by the manufacturing process. Thus, the measured birefringence of an actual article will be a resultant of its intrinsic birefringence and the manufacturing process. Because we are dealing with such amorphous polymeric materials, the following definitions refer to this measured birefringence and not intrinsic birefringence.

In-plane birefringence means the difference between $n_x$ and $n_y$, where x and y lie in the plane of the layer. $n_x$ will be defined as always being the larger refractive index, and $n_y$ will be defined as the being the smaller refractive index and as being perpendicular to $n_x$. The sign convention used will be $n_x-n_y$ and will always be positive.

Out of-plane birefringence means the difference between $n_z$ and the average of $n_x$ and $n_y$, where x and y lie in the plane of the layer and z lies in the plane normal to the layer. The sign convention used will be: $n_z-[(n_x+n_y)/2]$. TAC typically has a negative out of plane birefringence as its $n_z$ is smaller than its $n_x$ and $n_y$.

In-plane retardation (Re) means the product of in-plane birefringence and layer thickness (t). Thus $Re=t(n_x-n_y)$.

Out-of-plane retardation (Rth) means the product of out-of-plane birefringence and layer thickness (t). Thus $Rth=t(n_z-[(n_x+n_y)/2])$.

Synthetic polymer films (such as polycarbonate or polysulfone) are often used to enhance the minimal optical compensation that TAC provides. These synthetic polymers films are attached to the rest of the display by adhesive lamination.

Generally in the field of optical materials, the synthetic polymer film is used as an optically anisotropic film (having a high retardation value), while a TAC film is used as an optical isotropic film (having a low retardation value).

European Patent Application No. 0911656 A2 and Japanese Patent Publication 2000/275434 A both disclose a TAC film having high retardation. The TAC is used as a support for an optical compensator sheet, which comprises the TAC support and an optically anisotropic layer containing a discotic liquid crystal molecule. The TAC film achieves high retardation by three methods (including the combination of these three methods): 1) the addition of special aromatic small molecules (i.e. triphenylene) to the TAC film, 2) cooling of the TAC solution before casting the film, and 3) stretching the TAC film. The addition of special aromatic molecules is discussed as being problematic as it can lead to "bleeding" of these molecules out of the TAC film. Also in the examples of this invention very long times (over an hour) are required to dry such TAC films. Such times would not be amenable to a roll to roll process.

In addition to the TAC film, the highly anisotropic, discotic liquid crystal layer requires a special alignment technique and ultra violet radiation to crosslink this monomeric layer.

U.S. Published Patent Application 2001/0026338 A1 discloses a single TAC film with high retardation without the highly anisotropic discotic layer. This TAC film achieves high retardation by the incorporation of molecules with two or more aromatic groups into the TAC film followed by stretching of the TAC film. Without such stretching, this TAC film does not demonstrate any enhanced retardation compared to regular TAC. With this stretching both in and out of plane retardation are increased. These two orthogonal retardations cannot be independently controlled by this method.

Japanese Published Patent Application JP1999-95208 describes a liquid crystal display having an optical compensator (having high retardation) prepared by uniaxial stretching of a high polymer film. Such polymers include polyesters, polycarbonate, or polysulfone. This stretching step is essential to obtain the desired optical properties. This stretching affects both in- and out-of-plane retardation simultaneously. These two orthogonal retardations cannot be independently controlled by this method. Also, producing uniform optical compensators by this method is described as being difficult.

This application also describes a compensator where the inventor uses an exfoliated inorganic clay material in a polymeric binder coated on top of a TAC support. The exfoliated inorganic clay material in this layer is the optically active material, not the polymeric binder.

Japanese Published Application JP2001-194668 describes a compensator made by laminating polycarbonate films that have been stretched. Not only does the approach require lamination (with its associated difficulties), but it also requires two independent stretchings of two different types of polycarbonate. The lamination step also requires that the two films be in registry with each other and that their optical axes be orthogonal to each other.

U.S. Pat. Nos. 5,344,916, 5,480,964, and 5,580,950 describe compensation films for LDC's. However they do not mention the need for barrier layers to control curl and improve adhesion.

It is a problem to be solved to provide a multilayer optical compensator that is readily manufactured, that provides the required degree of in-plane and out-of-plane compensation, that has excellent adhesion between layers and is free of curl caused by application of organic solvent coating solutions.

SUMMARY OF THE INVENTION

The invention provides a multilayer compensator polymeric film for a LC cell comprising two or more first layers having an out-of-plane birefringence not more negative than −0.005 and one or more second layers having an out-of-plane birefringence more negative than −0.005, wherein the second layers are amorphous and comprise selected polymeric materials having sufficient thickness so that the overall in-plane retardation (Re) of the compensator is from 0 to 300 nm and the out-of-plane retardation (Rth) of at least one of the one or more second layers is more negative than −20 nm wherein:
  (a) a first layer is present that is contiguous to a second layer and is between all of the second layers and all of the other first layers;
  (b) at least one of the second layers or one of the other first layers is a layer coated from an organic solvent; and
  (c) the contiguous first layer contains a polymer that is water soluble or water dispersible in an amount sufficient to impede the diffusion of the organic solvent between the other first layers and the second layers.

The invention multilayer optical compensator is readily manufactured, provides the required degree of in-plane and out-of-plane compensation, provides excellent adhesion between layers, and is free of curl caused by application of organic solvent coating solutions.

DETAILED DESCRIPTION OF THE INVENTION

Figure 1:
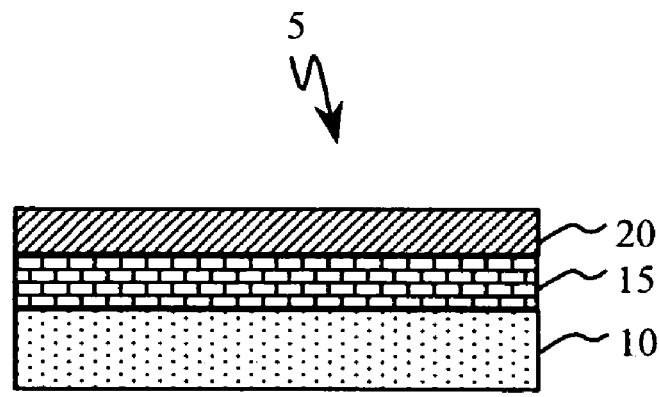
FIG. 1 is a cross-sectional view of a multi-layer compensator having 3 layers as an embodiment of the invention.

The invention is summarized above.

In one embodiment, the invention provides a multilayer compensator polymeric film for an LC cell comprising two or more first layers having an out-of-plane birefringence not more negative than −0.005 and one or more second layers having an out-of-plane birefringence more negative than −0.005, wherein the second layers are amorphous and comprise selected polymeric materials having sufficient thickness so that the overall in-plane retardation (Re) of the compensator is from 0 to 300 nm and the out-of-plane retardation (Rth) of at least one of the one or more second layers is more negative than −20 nm wherein:
  (a) a first layer is present that is contiguous to a second layer and is between all of the second layers and all of the other first layers;
  (b) at least one of the second layers or one of the other first layers is a layer coated from an organic solvent; and
  (c) the contiguous first layer contains a polymer that is water soluble or water dispersible in an amount sufficient to impede the diffusion of the organic solvent between the other first layers and the second layers.

The invention also provides a multilayer compensator for an LC cell comprising one or more first layers and one or more second, wherein the second layers are amorphous and comprise selected polymeric materials, in which each second layer comprises a polymer containing in the backbone a non-visible chromophore group and has a Tg above 180° C. and in which each first layer does not comprise such a polymer, the layers having sufficient thickness so that the overall in-plane retardation (Re) of the compensator is from 0 to 300 nm and the out-of-plane retardation (Rth) of at least one of the one or more second layers is more negative than −20 nm.

The first layer can comprise an amorphous polymer having a Tg less than 180° C., as opposed to the second layer where the amorphous polymer has a Tg above 180° C. and contains chromophores groups in the backbone. A chromophore is defined as an atom or group of atoms that serve as a unit in light adsorption. (*Modern Molecular Photochemistry* Nicholas J. Turro Editor, Benjamin/Cummings Publishing Co., Menlo Park, Calif. (1978) Pg 77). Typical chromophore groups include vinyl, carbonyl, amide, imide, ester, carbonate, aromatic (i.e. phenyl, naphthyl, biphenyl, thiophene, bisphenol), sulfone, and azo or combinations of these chromophores. A non-visible chromophore is one that has an absorption maximum outside the range of 400–700 nm.

Amorphous polymeric materials are used for the optical compensator of the invention. A variety of techniques can differentiate amorphous materials from ordered (crystalline, liquid crystalline) materials. X-ray diffraction, differential scanning calorimetry and polarized optical microscopy would be the techniques of choice to those skilled in the art. First layer materials are desirably suitable to be solvent cast or coated such as TAC, other cellulose esters, polycarbonate, and cyclic polyolefins.

The manufacture of TAC films is well known and includes the following process. A TAC solution (dope) can be prepared according to the following conventional method. In the conventional method, the procedures are conducted at a temperature of not less than 0° C. (room temperature or high temperature). The solution can be prepared by a known dope preparation process with an apparatus used in a normal solvent casting method. As the solvent, a halogenated hydrocarbon (particularly, methylene chloride) is typically used in this method. The amount of TAC is so adjusted that the content of cellulose acetate in a prepared solution is in the range of 10 to 40 wt. %, typically in the range of 10 to 30 wt. %. Additives (described below) can be added to the organic (main) solvent.

The dope is cast on a drum or a band, and the solvent is evaporated to form a film. Before casting the dope, the concentration of the dope is typically so adjusted that the solid content of the dope is in the range of 18 to 35 wt. %. The surface of the drum or band is typically polished to give a mirror plane. The casting and drying stages of the solvent cast methods are described in U.S. Pat. Nos. 2,336,310, 2,367,603, 2,492,078, 2,492,977, 2,492,978, 2,607,704, 2,739,069, 2,739,070, British Patent Nos. 640,731, 736,892, Japanese Patent Publication Nos. 45(1970)-4554, 49(1974)-5614, Japanese Patent Provisional Publication Nos. 60(1985)-176834, 60(1985)-203430 and 62(1987)-115035.

A plasticizer can be added to the cellulose acetate film to improve the mechanical strength of the film. The plasticizer has another function of shortening the time for the drying process. Phosphoric esters and carboxylic esters (such as phthalic esters and citric esters) are usually used as the plasticizer. Examples of the phosphoric esters include triphenyl phosphate (TPP) and tricresyl phosphate (TCP). Examples of the phthalic esters include dimethyl phthalate (DMP), diethyl phthalate (DEP), dibutyl phthalate (DBP), dioctyl phthalate (DOP), diphenyl phthalate (DPP) and diethylhexyl phthalate (DEHP). Examples of the citric esters include o-acetyltriethyl citrate (OACTE) and o-acetyltributyl citrate (OACTB).

Examples of the other carboxylic esters include butyl oleate, methylacetylricinoleate, dibutyl sebacate and various trimellitic esters. The plasticizers of phthalic esters (DMP, DEP, DBP, DOP, DPP, DEHP) are preferred, and DEP and DPP are particularly preferred. The amount of the plasticizer is in the range of typically 0.1 to 25 wt. %, conveniently 1 to 20 wt. %, desirably 3 to 15 wt. % based on the amount of cellulose acetate.

Stabilizers (e.g., oxidation inhibitor, peroxide decomposer, radical inhibitor, metal inactivating agent, oxygen scavenger, amine) can be also incorporated into the cellulose acetate film. The stabilizers are described in Japanese Patent Provisional Publication Nos. 3(1991)-199201, 5(1993)-1907073, 5(1993)-194789, 5(1993)-271471 and 6(1994)-107854.The amount of the deterioration inhibitor is in the range of 0.01 to 1 wt. %, typically 0.01 to 0.2 wt. % based on the amount of the solution (dope). If the amount is less than 0.01 wt. %, the deterioration inhibitor hardly gives the effect. On the other hand, if the amount is more than 1 wt. %, the deterioration inhibitor often bleeds out onto the film surface. Examples of particularly preferred deterioration inhibitors include butyrated hydroxytoluene (BHT) and tribenzylamine (TBA).

Organic solvents are liquids other than water. Typically these would include aromatic or alkyl hydrocarbons, alcohols, esters, ketones, aldehydes, and halogenated analogues of the preceding list. Conveniently these would include ethylacetate, propylacetate, butylacetate, acetone, methylethylketone, toluene, xylene, cycopentanone, cyclohexanone, and methylene chloride. Mixtures of the above organic solvents may also prove useful. Residual amounts of such organic solvents typically remain in the layers of the compensator. The amount retained in the compensator depends on such factors as vapor pressure of the solvent, appropriate diffusion constants, layer thickness, temperature, and duration of drying. These residual amounts of such organic solvents can be detected by techniques such as head-space gas chromatography at a minimum detection level of about 5mg/meter$^2$ and are indicative of the need for the barrier.

The thickness of the TAC film is less than 140 nm, typically in the range of 70 to 115$\mu$m, and desirably 40 to 100$\mu$m.

In the case that the cellulose acetate film is used as a transparent protective film of a polarizing plate, the film surface is typically subjected to a surface treatment. Examples of the surface treatments include a corona discharge treatment, a glow discharge treatment, a flame treatment, an acid treatment, an alkali treatment and an ultraviolet ray irradiating treatment. The acid treatment or the alkali treatment is preferred. The acid treatment or the alkali treatment can function as a saponification treatment to the cellulose acetate film.

The alkali treatment is particularly preferred. The alkali treatment uses an aqueous alkali solution. The alkali typically is hydroxide of an alkali metal, such as sodium hydroxide or potassium hydroxide. The aqueous alkali solution has a pH value of typically higher than 10. At least one surface of the cellulose acetate film is immersed in the aqueous alkali solution typically for 1 to 300 seconds, desirably for 5 to 240 seconds. The alkali treatment is conducted typically at 25 to 70° C., and desirably at 35 to 60° C. After the alkali treatment, the cellulose acetate film is typically washed with water.

First layer films as made by the above process will typically have in plane retardation ($R_e$) values of 0 to 5 nm. To generate greater amounts of $R_e$ (>5 nm) in the first layer, any viable methods can be used, however, the most commonly practiced approach is stretching. When a polymer is stretched, individual polymer chain segments are oriented predominantly to the direction of primary stretch, thus increase the in plane birefringence of the polymer layer. This is typically done above the glass transition temperature of the polymer. Thus, the polymeric film is heated above $T_g$ and stretched. Another method is to stretch the film while solvents are incorporated within the film. In this method, a wet cast film is stretched above its Tg. In other words the Tg of the film is lowered by solvent plasticization rather than heating a dry film above the Tg it would have without the presence of solvent. As noted in the background section, certain small molecules can be added to a stretched film to enhance $R_e$. The first film can be stretched uniaxially or biaxially. In uniaxial stretching, the film is stretched in one direction. In biaxial stretching, the two stretching directions are typically perpendicular to each other. The first layer has out of plane birefringence not more negative than –0.01, and the first layer of the multilayer compensator is such that the overall in-plane retardation ($R_e$) of said multilayer compensator can be between 0 and 300 nm.

In accordance with the present invention a first layer that is contiguous to a second layer and that is between all second layers and all of the other first layers, is a barrier layer that impedes the diffusion of organic solvents between the other first layers and the second layers. The barrier layer will typically be applied to a first layer such as a TAC film as described hereinabove. The barrier layer comprises a polymer having little or no out-of-plane birefringence that is water soluble or water dispersible. Water soluble polymers suitable for use in the barrier layer of the invention include polyvinyl alcohols and copolymers thereof, gelatin, gelatin derivatives, casein, agar, sodium alginate, starch, acrylic acid containing polymers, maleic anhydride containing polymers, hydrophilic cellulose esters such as carboxymethylcellulose, hydroxypropyl methyl cellulose, and polyacrylamides. Suitable water dispersible polymers include polyesters, particularly polyesterionomers, polyurethanes, and latex polymers having hydrophilic functionality such as (meth)acrylic acid containing polymers, maleic anhydride containing polymers, itaconic acid containing polymers, styrene sulfonic acid containing polymers, and the like.

In order to optimize both barrier properties and adhesion to contiguous layers, the barrier layer typically will contain two or more polymers. For example, the barrier layer may contain a water-soluble polymer such as gelatin and a water dispersible polymer such as a polyesterionomer. Alternatively, the barrier layer may contain two different water dispersible polymers such as a polyesterionomer and a polyurethane.

The barrier layer may be crosslinked using known methods such as the addition of crosslinking agents, such at isocyanates, aldehydes, vinyl sulfone materials, aziridines and melamine resins or by exposure of the dried layer to actinic radiation.

The barrier layer is generally applied at dried coating weights between 50 and 6000 mg/m², more typically between 100 and 1000 mg/m². Barrier layer dried coating weights less than 35 mg/m² are insufficient to prevent the diffusion of organic solvents from subsequently layers from penetrating other first layers such as TAC film.

The barrier layer is applied by known coating techniques from water. It may be dried using conventional techniques. When gelatin is used in the barrier layer, additional improvements may be observed if it is chilled between 5 and 20° C. after applying it to the support.

Addenda such as surfactants or rheology modifiers may be added to the barrier layer to improve coating quality, adhesion and other properties of the layer.

The second layer will typically be solvent coated onto the barrier layer. This solvent coating could be accomplished by spin coating, hopper coating, gravure coating, wire bar coating or other coating methods known to those skilled in the art.

The second layer is coated from a solution containing a polymer that yields high negative out of plane birefringence upon solvent coating. To produce negative out of plane birefringence (negative out of plane retardation), polymers that contain non-visible chromophore groups such as vinyl, carbonyl, amide, imide, ester, carbonate, sulfone, azo, and aromatic groups (i.e. benzene, naphthalate, biphenyl, bisphenol A) in the polymer backbone will be used, such as polyesters, polycarbonates, polyimides, polyetherimides, and polythiophenes. One could also add fillers and non-polymeric molecules to this second layer.

Desirably, polymers to be used in the second layer will not have chromophores off the backbone. An example of such an undesirable polymer with chromophores off the backbone would be polyarylates possessing the fluorene group.

Amorphous polymeric materials are used for the second layer of the invention. A variety of techniques can differentiate amorphous materials from ordered (crystalline, liquid crystalline) materials. X-ray diffraction, differential scanning calorimetry and polarized optical microscopy would be the techniques of choice to those skilled in the art.

The glass transition temperature (Tg) of the polymers used in the second layer is significant. It should be above 180° C. to achieve the desired results.

The polymers used in the second layer could be synthesized by a variety of techniques: condensation, addition, anionic, cationic or other common methods of synthesis could be employed.

The thickness of this second layer should be less than 30µm. Typically it should be from 0.1µm to 20µm. Conveniently it should be from 1.0µm to 10µm. Desirably it should be from 2µm to 8µm.

The combined thickness of the multilayer compensator should be less than 115µm. Typically it should be from 20µm to 105µm. Desirably it should be from 40µm to 100µm.

The second layer should be of sufficient thickness so that the out-of-plane retardation of the second layer is more negative than −20 nm. Typically it should be from −600 to −40. Conveniently it should be from −500 to −60. Desirably it should be from −400 to −80.

The invention also provides a process for forming a compensator polymeric film for a LC display comprising two or more first layers having an out-of-plane birefringence not more negative than −0.005 and one or more second layers having an out-of-plane birefringence more negative than −0.005, wherein the second layers are amorphous and comprise selected polymeric materials having sufficient thickness so that the overall in-plane retardation (Re) of the compensator is from 0 to 300 nm and the out-of-plane retardation (Rth) of at least one of the one or more second layers is more negative than −20 nm wherein:

(a) at least one of the layers is coated from an organic coating solvent;

(b) a contiguous first and second layer are coated to separate any other first layers from any other second layers; and (c) at least one of the contiguous first or second layers contains a polymer that is water soluble or water dispersible in an amount sufficient to impede the diffusion of the organic solvent between the contiguous layers.

The invention is described in more detail by referring to the drawings as follows.

FIG. 1 shows a cross-sectional schematic of a multilayer compensator 5 in accordance with the present invention. The compensator includes a polymeric layer 10 having low out of plane birefringence, a polymeric layer 15 having low out of plane birefringence that also serves as a barrier layer, and a polymeric layer 20 that is contiguous to the barrier layer 15 and having high out of plane birefringence, and the combined in-plane retardation ($R_e$) of layers 10, 15 and 20 is from 0 to 300 nm and the out-of-plane retardation ($R_{th}$) of layer 20 is more negative than −20 nm.

Figure 2:
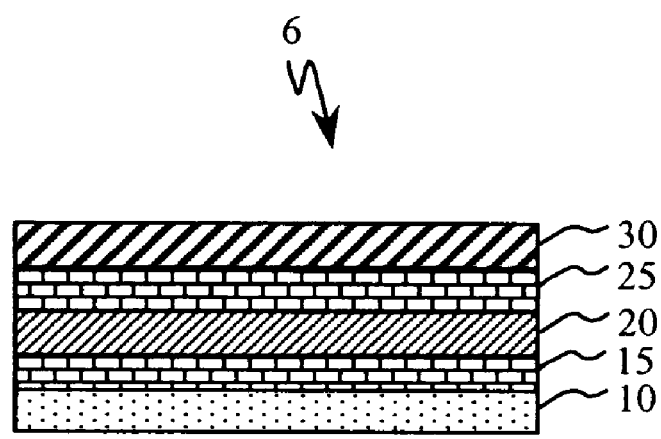
FIG. 2 is a cross-sectional view of a multi-layer compensator having 4 layers as an embodiment of the invention.

FIG. 2 shows a cross-sectional schematic of another multilayer compensator 6 in accordance with the present invention. The compensator includes a polymeric layer 10 having low out of plane birefringence, a polymeric layer 15 having low out of plane birefringence that also serves as a barrier layer, a polymeric layer 20 having high out of plane birefringence, a polymeric layer 25 having low out of plane birefringence that also serves as a barrier layer, and a polymeric layer 30 having low out of plane birefringence, wherein barrier layer 15 is contiguous to layers 10 and 20 and barrier layer 25 is contiguous to layers 20 and 30, and the combined in-plane retardation (Re) of the layers 10, 15, 20, 25 and 30 is from 0 to 300 nm and the out-of-plane retardation (Rth) of layer 20 is more negative than −20 nm. The composition of layers 10 and 30 may or may not be the same. Also, the composition of barrier layers 15 and 25 may or may not be the same.

Figure 3:
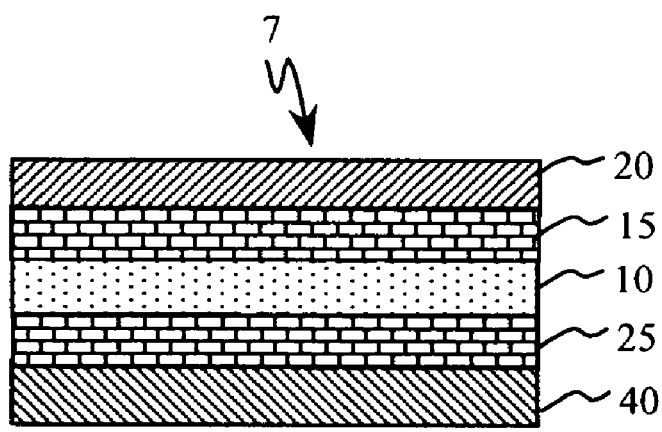
FIG. 3 is a cross-sectional view of a multi-layer compensator having 5 layers as an embodiment of the invention.

FIG. 3 shows a cross-sectional schematic of another multilayer compensator 7 in accordance with the present invention. The compensator includes a polymeric layer 10 having low out of plane birefringence, a polymeric layer 15 having low out of plane birefringence that also serves as a barrier layer, a polymeric layer 20 having high out of plane birefringence, a polymeric layer 25 having low out of plane birefringence that also serves as a barrier layer, and a polymeric layer 40 having high out of plane birefringence, wherein barrier layer 15 is contiguous to layers 10 and 20 and barrier layer 25 is contiguous to layers 10 and 40, and the combined in-plane retardation (Re) of the layers 10, 15, 20, 25 and 40 is from 0 to 300 nm and the combined out-of-plane retardation (Rth) of layers 20 and 40 is more negative than −20 nm. The composition of layers 20 and 40 may or may not be the same. Also, the composition of barrier layers 15 and 25 may or may not be the same. Conveniently, layers 20 and 40 have the same composition and thickness in order to provide a symmetrical multilayer compensator. One skilled in the art could conceive of more complex structures.

Figure 4A:
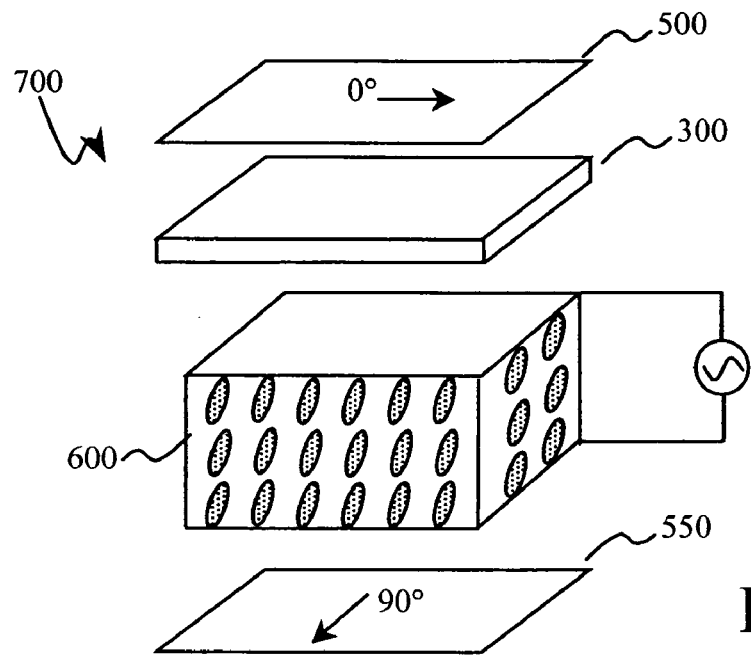
FIG. 4a is an exploded view of a liquid crystal display with one compensating film as an embodiment of the invention.

FIG. 4A shows a schematic liquid crystal display 700 where 300 is a single compensating film is placed on one side of the liquid crystal cell 600. 500 is a polarizer, and 550 is a second polarizer. The transmission axes for the polarizers 500 and 550 form a 90°±10° angle relative to each other. The angles of their transmission axes are denoted as 0° and 90°.relative to the liquid crystal cell 600. However, other angles are possible depending on the kind of liquid crystal display 700 and this is obvious to those who skilled in the art. Note that 600 is the electrically switchable liquid crystal cell with the liquid crystals confined between two glass plates.

Figure 4B:
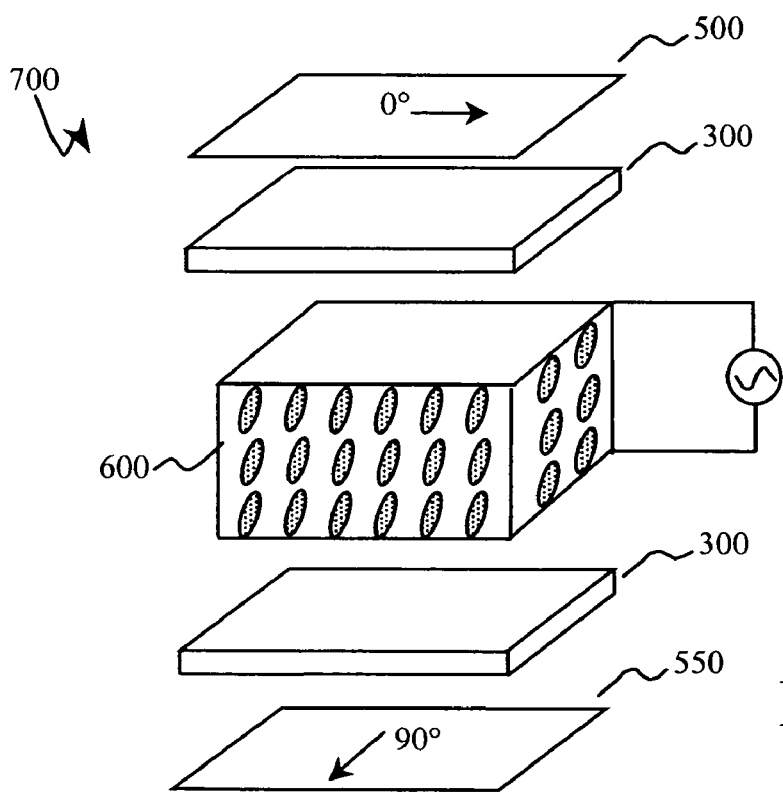
FIG. 4b is an exploded view of a liquid crystal display with two compensating films as an embodiment of the invention.

FIG. 4B shows another schematic liquid crystal display 700 where there are two compensating films 300 placed on both sides of the liquid crystal cell (600). 500 is a polarizer and 550 is a second polarizer. The transmission axes for the polarizers 500 and 550 form a 90°±10° angle relative to each other. The angles of their transmission axes are denoted as 0° and 90° relative to the liquid crystal cell 600. However, other angles are possible depending on the kind of liquid crystal display 700 and this is obvious to those who skilled in the art. Note that 600 is the electrically switchable liquid crystal cell with the liquid crystals confined between two glass plates.

Compared to the prior art, embodiments of the present invention avoid the need to stretch the film, do not require the use of expensive liquid crystal molecules, do not require film lamination (thus reducing the chance introduction of dirt or unwanted optical retardation from the laminating adhesive), provide enhanced optical compensation in a relatively thin (<115 um) structure, and are easily manufactured. As a further attribute, embodiments enable the control of Re which is primarily the responsibility of the first layer while control of Rth is primarily the responsibility of the second layer. In the prior art, Re and Rth are often coupled and are not controlled independently. The embodiments of the present invention also provide a compensator having excellent adhesion between layers and that is free of organic solvent-induced curl.

The present invention is further illustrated by the following non-limiting examples of its practice.

EXAMPLES

The aromatic polyesters used herein can be prepared using any suitable or conventional procedure. The procedure used herein followed that outlined by P. W. Morgan in Condensation Polymers: By Interfacial and Solution Methods, Interscience, New York City, N.Y. (1965).

Polymer A (Synthesis):

To a stirred mixture of 4,4'-hexafluoroisopropylidene-diphenol (23.53 g, 0.07 mole), 4,4'-(2-norbomylidene) bisphenol (8.4 g, 0.03 mole) and triethylamine (22.3 g, 0.22 mole) in methyl ethyl ketone (100 mL) at 10° C. was added a solution of terephthaloyl chloride (18.27 g, 0.09 mole) and isophthaloyl chloride (2.04 g, 0.01 mole) in methyl ethyl ketone (60 mL). After the addition, the temperature was allowed to rise to room temperature and the solution was stirred under nitrogen for 4 hours, during which time triethylamine hydrochloride precipitated in a gelatinous form and the solution became viscous. The solution was then diluted with toluene (160 mL) and washed with dilute hydrochloric acid, (200 mL of 2% acid) followed three times by water (200 mL). The solution was then poured into isopropanol with vigorous stirring, and a white bead like polymer precipitated, collected and dried at 50° C. under vacuum for 24 hours. The glass transition temperature of this polymer was measured by differential scanning calorimetry to be 265° C.

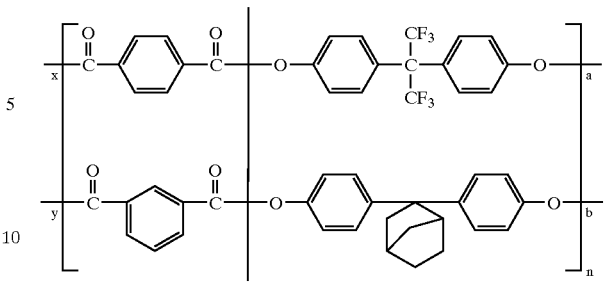

where x=90, y=10
and a=70, b=30

Poly(4,4'-hexafluoroisopropylidene-bisphenol-co-4, 4'-(2-norbomylidene)bisphenol) terephthalate-co-isophthalate.

Polymer A

Barrier A (Formulation):

Sancure 898 (a polyurethane dispersed in water at 30% solids, B.F. Goodrich Corp) was combined with Eastek 1100 (a polyesterionomer dispersed in water 33% solids, Eastman Chemical Corp) and additional water to produce a solution that had a total solids of 20%. The ratio of these two polymers was such that the 20% solids solution produced dry coatings that were 80% Sancure 898 and 20% Eastek 1100.

Barrier B (Formulation):

Gelatin (bovine) and poly(ethyleneimine) (Mica A-131-X, Mica Corp.) were combined with water to produce a solution that had a total solids of 3%. The ratio of these two polymers was such that the 3% solids solution produced dry coatings that were 95% gelatin and 5% poly(ethyleneimine).

Comparative Example 1 solution of polymer A (9% solids in propylacetate) was coated onto a TAC web. This included the steps of unrolling the TAC web, exposing the TAC web to a corona discharge treatment (CDT, 1200 watts at 100 ft/min), coating the polymer solution (using a slot hopper), and applying sufficient drying (85° C.) to remove the majority of the propylacetate. These steps occurred in a roll to roll, continuous process. Spin coating and other coating methods could also be used. Optically clear films of the TAC/polyester structure were produced with the following properties. Re, Rth and the polyester layer thickness were measured with an ellipsometer (model M2000V, J.A. Woollam Co.) at 550 nm wavelength.

Comparative Example 2

A barrier solution (barrier B formulation, 3% solids in water) was coated onto a TAC web. This included the steps of unrolling the TAC web, exposing the TAC web to a corona discharge treatment (CDT, 1200 watts at 100 ft/min), coating the barrier A solution (using a slot hopper), and applying sufficient drying (85° C.) to remove the majority of the water. Using a second slot hopper on the same machine, polymer A (13% solids in propylacetate) was coated on top of the now dried barrier layer. This second coating step was followed by sufficient drying (85° C.), thus removing the majority of the propylacetate. These steps occurred in a roll to roll, continuous process. Spin coating and other coating methods could also be used. Optically clear films of the TAC/barrier/polyester structure were produced with the following properties. Re, Rth and the layer thicknesses were measured with an ellipsometer (model M2000V, J.A. Woollam Co.) at 550 nm wavelength.

Example 1

A barrier solution (barrier A formulation, 20% solids in water) was coated onto a TAC web. This included the steps of unrolling the TAC web, exposing the TAC web to a corona discharge treatment (CDT, 1200 watts at 100 ft/min), coating the barrier A solution (using a slot hopper), and applying sufficient drying (85° C.) to remove the majority of the water. Using a second slot hopper on the same machine, polymer A (9% solids in propylacetate) was coated on top of the now dried barrier layer. This second coating step was followed by sufficient drying (85° C.), thus removing the majority of the propylacetate. These steps occurred in a roll to roll, continuous process. Spin coating and other coating methods could also be used. Optically clear films of the TAC/barrier/polyester structure were produced with the following properties. Re, Rth and the layer thickness were measured with an ellipsometer (model M2000V, J.A. Woollam Co.) at 550 nm wavelength.

Adhesion and curl measurements were performed on equilibrated samples (three days after coating at room conditions). Adhesion was measured by scribing the coated layer(s) on the TAC web and placing a high tack adhesive tape on the scribed area. The tape was quickly removed from the sample and the extent of the scribed area removed is a measure of the adhesion. Curl was measured by placing a 10 inch by 10 inch sample on a flat surface and measuring the height in millimeters of the edge rise of the sample along the width direction. (Severe solvent-induced curl results in the sample rolling up into a cylinder or tube and no edge rise height can be obtained). The results for Example 1 and the Comparative Examples are shown in Table 1.

TABLE 1

|  | Comparative Example 1 | Comparative Example 2 | Example 1 |
| --- | --- | --- | --- |
| Curl | "tube" | 2 mm | 10 mm |
| Adhesion | complete removal | complete removal | x5% removal |
| In Plane Retardation (Re), nm | 2 | 2 | 2 |
| Out of Plane Retardation (Rth), nm | −105 | −139 | −150 |
| Barrier thickness, μm | 0 | 0.43 | 3.76 |
| Polyester thickness, μm | 3.76 | 3.06 | 2.85 |

The results in Table 1 clearly show a sample with no barrier (comparative example 1) that has unacceptable curl and adhesion, a barrier layer (comparative example 2) that controls curl, improves the formation efficiency of out of plane retardation (preserves out of plane birefringence) but has no adhesion and a barrier layer (example 1) that reduces curl, improves adhesion and improves the formation efficiency of out of plane retardation (preserves out of plane birefringence).

Parts List
5 compensator according to the present invention
6 compensator according to the present invention
7 compensator according to the present invention
10 first polymeric layer having low out of plane birefringence
15 second polymeric layer having low out of plane birefringence that serves as a barrier
20 third polymeric layer having high out of plane birefringence
25 fourth polymeric layer having low out of plane birefringence that serves as a barrier
30 fifth polymeric layer having low out of plane birefringence
40 fifth polymeric layer having high out of plane birefringence
300 compensator according to the present invention
500 polarizer
550 polarizer
600 liquid crystal cell
700 liquid crystal display

What is claimed is:

1. A multilayer compensator polymeric film for a LC cell comprising two or more first type layers having an out-of-plane birefringence not more negative than −0.005 and one or more second type layers having an out-of-plane birefringence more negative than −0.005, wherein the second type-layers are amorphous and comprise selected polymeric materials having sufficient thickness so that the overall in-plane retardation (Re) of the compensator is from 0 to 300 nm and the out-of-plane retardation (Rth) of at least one of the one or more second type layers is more negative than −20 nm wherein:
   (a) the first type layer is present that is contiguous to the second type layer and is between all of the second type layers and all of the other first type layers;
   (b) at least one of the second type layers or one of the other first layers is a layer coated from an organic solvent; and
   (c) the contiguous first type layer contains a polymer that is water soluble or water dispersible in an amount sufficient to impede the diffusion of the organic solvent between the other first layers and the second type layers.

2. The compensator of claim 1 wherein an organic solvent is contained in at least one of the layers.

3. A liquid crystal (LC) display comprising a liquid crystal cell, crossed polarizers located one on each side of the cell, and at least one compensator of claim 2.

4. The compensator of claim 1 wherein the organic solvent comprises one selected from the group consisting of aromatic or alkyl hydrocarbons, alcohols, esters, ketones, aldehydes, and halogenated analogues of the foregoing.

5. The compensator of claim 1 wherein the organic solvent comprises one selected from the group consisting of ethylacetate, propylacetate, butylacetate, acetone, methylethylketone, toluene, xylene, cycopentanone, cyclohexanone, and methylene chloride.

6. The compensator of claim 1 wherein each of the one or more first type layers has an out-of-plane birefringence not more negative than −0.005.

7. The compensator of claim 1 wherein each of the one or more second type layers has an out-of-plane birefringence more negative than −0.005.

8. The compensator of claim 1 wherein at least two of the first type layers are contiguous.

9. The compensator of claim 1 wherein all of the first and second type layers are contiguous.

10. The compensator of claim 1 wherein the combined second type layers have a thickness of less than 30 micrometers.

11. The compensator of claim 1 wherein the combined second type layers have a thickness of from 0.1 to 20 micrometers.

12. The compensator of claim 1 wherein the combined second type layers have a thickness of from 1.0 to 10 micrometers.

13. The compensator of claim 1 wherein the combined second type layers have a thickness of from 2 to 8 micrometers.

14. The compensator of claim 1 wherein the thickness of the combined first and second type layers of the compensator is less than 115 micrometers.

15. The compensator of claim 1 wherein the thickness of the combined first and second type layers of the compensator is from 20 to 105 micrometers.

16. The compensator of claim 1 wherein the thickness of the combined first and second type layers of the compensator is from 40 to 100 micrometers.

17. The compensator of claim 1 wherein the Rth of at least one second type layer is −20 nm or more negative.

18. The compensator of claim 1 wherein the Rth of at least one second type layer is from −40 to −600 nm.

19. The compensator of claim 1 wherein the Rth of at least one second type layer is from −60 to −500 nm.

20. The compensator of claim 1 wherein the second layer comprises a polymer containing in the backbone a non-visible chromophore group and has a Tg above 180° C.

21. The compensator of claim 1 wherein the polymer exhibits a Tg above 180° C.

22. The compensator of claim 21 wherein the second layer comprises a polymer containing in the backbone a vinyl, carbonyl, amide, imide, ester, carbonate, aromatic, sulfone, or azo group.

23. The compensator of claim 20 wherein the non-visible chromophore group includes a carbonyl, amide, imide, ester, carbonate, phenyl, naphthyl, biphenyl, bisphenol, or thiophene group.

24. The compensator of claim 1 wherein the second type layer comprises 1) poly(4,4'-hexafluoroisopropylidene-bisphenol) terephthalate-co-isophthalate, 2) poly(4,4'-hexahydro-4,7-methanoindan-s-ylidene bisphenol)terephthalate, 3) poly(4,4'-isopropylidene-z,z'6,6'-tetrachlorobisphenol) terephthalate-co-isophthalate, 4) polyt4y4'-hexafluoroisopropylidene)-bisphenol-co-(2-norbomylidene)-bisphenol terephthalate, 5) poly(4,4'-hexahydro-4,7-methanoindan-5-ylidene)-bisphenol-co-t4,4'-isopropylidene-2,2',6,6'-tetrabromo)-bisphenol terephthalate, or 6) poly(4,4'-isopropylidene-bisphenol-co-4,4'-(2-norbomylidene)-bisphenol)terephthalate-co-isophthalate or copolymers of any of the foregoing.

25. The compensator of claim 1 wherein the second type layer comprises poly(4,4'-hexafluoroisopropylidene-bisphenol-co-4,4'-(2-norbomylidene)bisphenol)terephthalate-co-isophthalate or copolymers thereof.

26. The compensator of claim 1 wherein the first type layer comprises a polymer other than a polymer containing in the backbone a non-visible chromophore group having a Tg above 180° C.

27. The compensator of claim 20 wherein the second layer comprises a polymer containing in the backbone a non-visible chromophore group that does not contain a chromophore off of the backbone.

28. The compensator of claim 1 wherein one of the first type layers comprises esters of cellulose, polycarbonate, cyclic polyolefin or polyarylate containing fluorene groups.

29. The compensator of claim 1 wherein one of the first type layers comprises triacetylcellulose (TAC).

30. A liquid crystal (LC) display comprising a liquid crystal cell, crossed polarizers located one on each side of the cell, and at least one compensator of claim 1.

31. A multilayer compensator for an LC cell comprising one or more first type layers and one or more second type layers, wherein the second type layers are amorphous and comprise selected polymeric materials, in which each second layer comprises a polymer containing in the backbone a non-visible chromophore group and has a Tg above 180° C. and in which each first type layer does not comprise such a polymer, the layers having sufficient thickness so that the overall in-plane retardation (Re) of the compensator is from 0 to 300 nm and the out-of-plane retardation (Rth) of at least one of the one or more second layers is more negative than −20 nm.

32. A liquid crystal (LC) display comprising a liquid crystal cell, crossed polarizers located one on each side of the cell, and at least one compensator of claim 31.

33. The display of claim 31 wherein the liquid crystal cell is a vertically aligned or twisted nematic cell.

34. The display of claim 31 employing in-plane switching.

35. A process for forming a compensator polymeric film for a LC display comprising two or more first type layers having an out-of-plane birefringence not more negative than −0.005 and one or more second layers having an out-of-plane birefringence more negative than −0.005, wherein the second type layers are amorphous and comprise selected polymeric materials having sufficient thickness so that the overall in-plane retardation (Re) of the compensator is from 0 to 300 nm and the out-of-plane retardation (Rth) of at least one of the one or more second type layers is more negative than −20 nm wherein:
   (a) at least one of the layers is coated from an organic coating solvent;
   (b) a contiguous first and second type layer are coated to separate any other first type layers from any other second type layers; and
   (c) at least one of the contiguous first or second type layers contains a polymer that is applied from water and is present in an amount sufficient to impede the diffusion of the organic solvent between the contiguous layers.

36. The process of claim 35 wherein an organic solvent is contained in at least one of the layers.

37. The process of claim 35 wherein the organic solvent comprises one selected from the group consisting of aromatic or alkyl hydrocarbons, alcohols, esters, ketones, aldehydes, and halogenated analogues of the foregoing.

38. The process of claim 35 wherein the organic solvent comprises one selected from the group consisting of ethylacetate, propylacetate, butylacetate, acetone, methylethylketone, toluene, xylene, cycopentanone, cyclohexanone, and methylene chloride.

39. The process of claim 35 wherein at least one of the contiguous first or second layers that contains a polymer that is applied from water and is present in an amount sufficient to impede the diffusion of the organic solvent between the contiguous layers is crosslinked.

* * * * *